Figure 1:
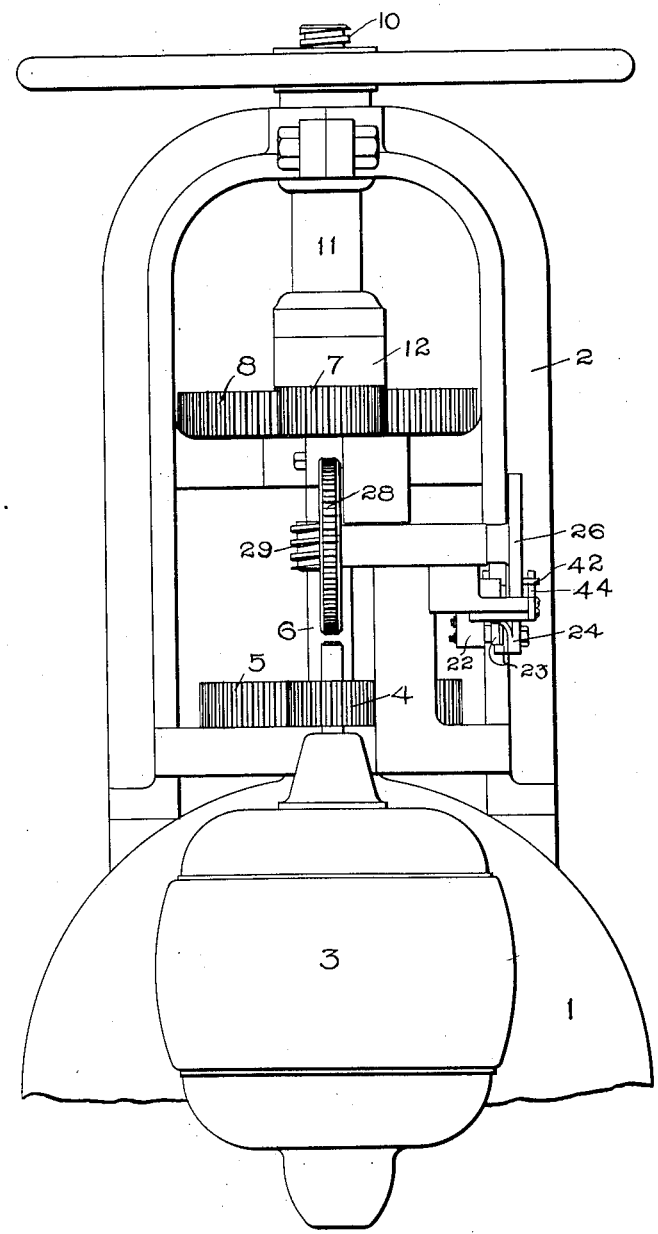

No. 854,712. PATENTED MAY 28, 1907.
N. C. BASSETT.
CONTROLLING MOTORS AT A DISTANCE.
APPLICATION FILED MAR. 24, 1902. RENEWED MAR. 23, 1903.

3 SHEETS—SHEET 1.

Witnesses.
Erning R Gurney.
Benjamin B. Hill.

Inventor.
Norman C. Bassett.
by Albert S. Davis
Atty.

No. 854,712. PATENTED MAY 28, 1907.
N. C. BASSETT.
CONTROLLING MOTORS AT A DISTANCE.
APPLICATION FILED MAR. 24, 1902. RENEWED MAR. 23, 1903.

3 SHEETS—SHEET 3.

Witnesses.

Inventor.
Norman C Bassett.
by Albert G. Davis
Atty.

UNITED STATES PATENT OFFICE.

NORMAN C. BASSETT, OF LYNN, MASSACHUSETTS, ASSIGNOR TO GENERAL ELECTRIC COMPANY, A CORPORATION OF NEW YORK.

CONTROLLING MOTORS AT A DISTANCE.

No. 854,712.      Specification of Letters Patent.      Patented May 28, 1907.

Application filed March 24, 1902. Renewed March 23, 1903. Serial No. 149,207.

*To all whom it may concern:*

Be it known that I, NORMAN C. BASSETT, a citizen of the United States, residing at Lynn, in the county of Essex, State of Massachusetts, have invented certain new and useful Improvements in Controlling Motors at a Distance, of which the following is a specification.

This invention relates to devices for controlling electric motors from a distance, and especially those used for actuating valves, such as the throttle valves of large steam engines. It is usually a matter of several minutes to shut off the steam and stop such an engine, and if an accident occurs, giving the engineer barely time to run for his life, he must leave the engine running, often to its own destruction and great injury to other machinery, or even of other workmen. My invention permits him to control the steam valve from a distant point, and if it should be necessary for him to escape even from that point of duty, he can insure the prompt and automatic stopping of the engine by simply throwing a switch and leaving the apparatus to effect its usual functions.

This invention consists in the combination with an electric motor and a movable body to which it is connected, such as a steam valve, of a double-pole double-throw switch located at a distant point and in circuit with the motor; a rheostat at the motor arranged to be automatically cut into circuit as the valve nears its fully open or shut position and cut out of circuit as it leaves said position, and devices whereby the motor is permitted to make a number of revolutions before it actually commences to move the valve in either direction. There are also indicating circuits to notify the operator when the valve reaches the limit of its movement in one direction or the other.

It has been found that in most cases the valve can be opened at the same current under which it is closed, and the amount of this current may be determined by a permanent resistance in the line. But in some cases it requires much more current to open the valve than to close it, arising from the fact that when the valve is left closed a long time it may corrode more or less, or, in the case of large steam gate-valves, it may get pinched between the seats by the expansion of the heavy steam pipe on each side of the valve. It is therefore necessary to provide means for cutting out the normal resistance so as to get much more than the normal current to operate the valve, the resistance being cut in automatically as the valve-gate approaches either extreme of its travel to slow the motor down and prevent damaging of the parts by the momentum of the armature or too much current.

Figure 2:
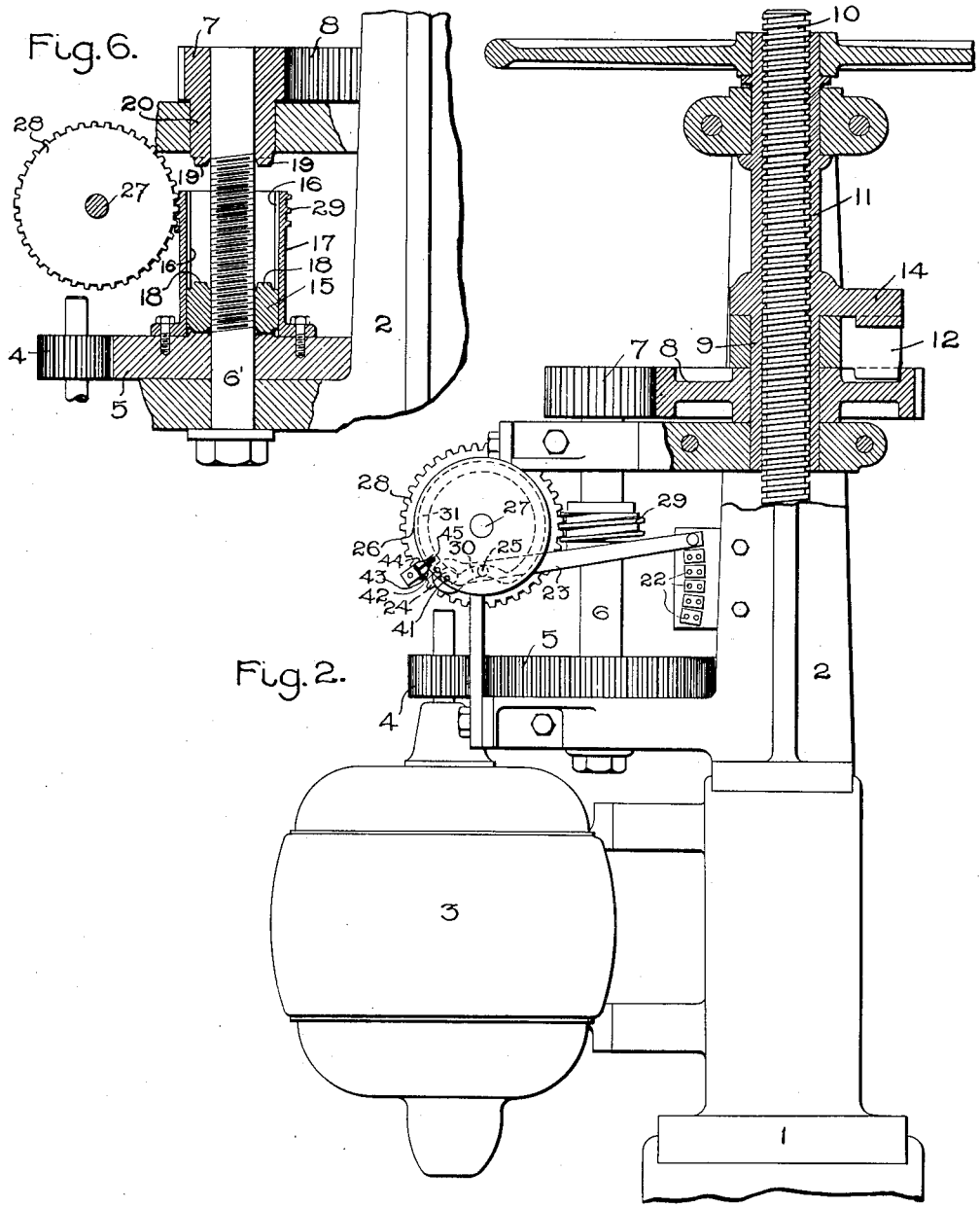
Figure 3:
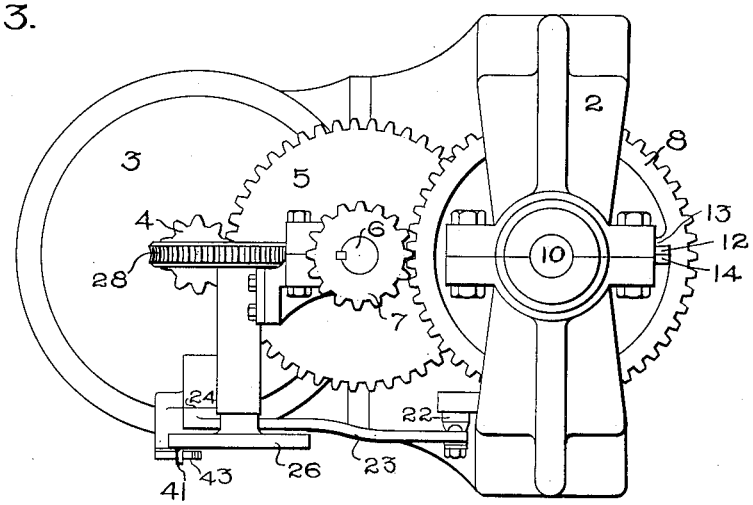
Figure 4:
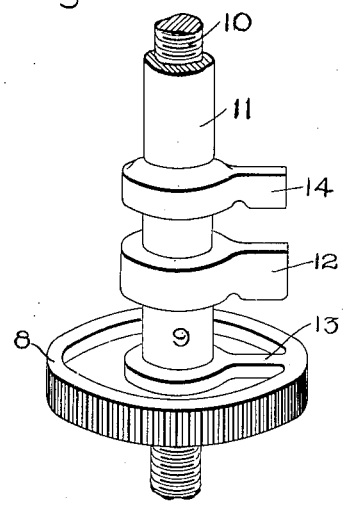
Figure 5:
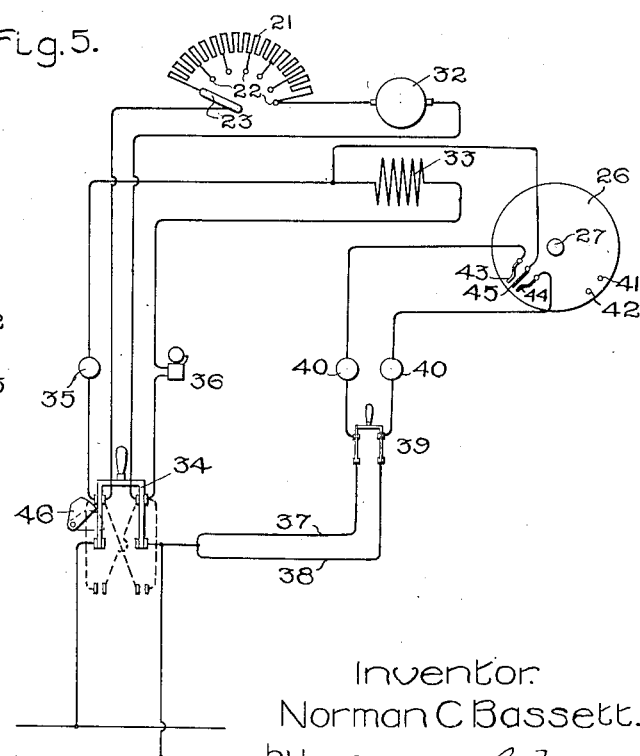

In the accompanying drawings, Figure 1 is a front view of the upper portion of a valve equipped with my invention; Fig. 2 is a side elevation of the same, partly in section; Fig. 3 is a top plan view of the same; Fig. 4 is a perspective view of the lost-motion devices, the parts being separated; Fig. 5 is a diagram of the circuits; and Fig. 6 is a section of a modification.

The valve is of the reciprocating or sliding-gate pattern, and has a casing 1 surmounted by a bonnet 2 to which is secured the electric motor 3, geared by a pinion 4 to a gear-wheel 5 on an upright shaft 6. A pinion 7 on this shaft meshes with a gear-wheel 8 which turns loosely on a sleeve 9 concentric with the screw-spindle 10 of the valve, and carrying at its upper end a nut 11 meshing with the screw-threads on said spindle. Between the gear-wheel 8 and the sleeve 9 is a lost-motion device, consisting preferably of an arm 12 loosely rotatable on the sleeve and adapted to abut against a lug 13 on the upper side of the gear-wheel and a lug or arm 14 projecting from the sleeve. The sleeve 9 also has a slight end play, space for which is shown at the upper end of the sleeve in Fig. 2.

The mechanism thus far described permits the motor to rotate the gear-wheel 8 almost a full revolution before its lug 13 strikes the arm 12, and then the gear-wheel and arm make nearly another revolution before the arm strikes the lug 14 on the sleeve. The relative sizes of the pinions and gears are such that the motor will make twenty or twenty-five revolutions before it starts the nut-carrying sleeve, and the slight end play of this sleeve will give the motor time for a few more turns before it starts the valve. All this is for the purpose of enabling the motor to get up speed, so that its momentum will be sufficient to start the valve even if it should stick somewhat on its seat.

A modified lost-motion device is shown in Fig. 6. The upright shaft 6' is provided with screw-threads. A nut 15 meshes with the screw-threads and has wings engaging in longitudinal grooves 16 in a cylindrical sleeve 17 secured to the gear-wheel 5 concentric with the shaft. The upper face of the nut has lugs 18 to engage with lugs 19 on the lower end of the hub 20 of the pinion 7, which is fast on the shaft 6'. The operation of this device is as follows: The friction of the valve, spindle and gearing is sufficient to hold the shaft 6' stationary when the motor begins to rotate the gear-wheel 5. The rotation of the sleeve 17 therefore causes the nut to travel up the shaft until its lugs 18 clutch with those on the pinion hub and compel the latter and the shaft 6' to rotate, thereby setting in motion the other gearing and the valve. On the reverse movement, the rotation of the motor and the gear-wheel 5 will cause the nut to travel down the shaft until it strikes the top of the gear-wheel and is stopped thereby, whereupon the shaft and the upper gearing will be set in motion to shut the valve.

In both of these lost-motion devices it is assumed that they will enable the motor to acquire sufficient momentum to start the valve off its seat. In some cases, however, it will not do to rely on this momentum, and I therefore provide for giving the motor an increasing amount of current, as is shown in Figs. 1, 2 and 3, whereby the resistance can be cut out to give a greater lifting current. In this device the coils of the resistance 21 are connected with contact-segments 22 with which a switch-arm 23 co-operates. This arm is pivoted at 24 and carries a pin or roller 25 engaging with a cam-groove in a disk 26 mounted on a shaft 27 carrying a worm-wheel 28 meshing with a worm 29 on the upright shaft 6. The cam-groove is so shaped and the worm-gearing is so proportioned that when the valve is fully open or shut the roller rests in the middle of the offset 30 in said groove with all the resistance cut into the motor circuit, the cam-wheel 28 making one revolution only for full travel of valve. It follows that, whichever way the motor starts, the switch-arm will begin to cut out the resistance, and after it is cut out the concentric portion 31 of the groove keeps the switch-arm in that position until the valve nears the end of its travel, when the resistance is gradually cut in again to slow down the motor.

Assuming that the pin or roller 25 is in the middle of the offset portion 30 of the groove, it will be seen that the first twenty or twenty-five revolutions of the motor will cut out the resistance and allow full line current to pass through the motor to cause it to exert a much greater lifting effort, and the difference in current can be made any amount by introducing the proper resistance. When the valve becomes nearly wide open, the roller 25 again enters the offset 31, and the resistance is cut in to slow the motor down so that it will not jam the valve open too hard.

The circuits are diagrammed in Fig. 5, in which the motor-armature 32 and its shunt field-coil 33 are shown connected with a double-pole double-throw switch 34 arranged to reverse the armature connections when thrown from one position to the other. The resistance coils 21 are in series with the armature, and the switch-arm 23 acts to cut said coils in or out in the usual manner.

The motor is preferably so designed that it can remain at rest for half an hour or more under full current without dangerous overheating, so that in case the operator forgot to turn off the current after the valve had been operated, no harm would result before the error would likely be discovered. To make sure however that such carelessness will be promptly detected, an electric lamp 35 or an electric bell 36, or both, may be placed in one of the motor circuits, so that the engineer will have both visual and audible reminders that he has not pulled the switch.

In some instalments, for instance waterworks valves at distance points, it is desirable to know definitely whether the valve has been completely closed or opened, or not, or whether obstructions have checked the valve part way. To indicate this, a separate signaling circuit is provided having two legs 37 38 in multiple and controlled by a double-pole switch 39. In each leg is a lamp, bell or other signaling device 40. On the side of the disk 26 are two tappets 41 42, each of which when the disk nears the end of its rotation strikes the flexible contact spring 43 or 44 and closes it against the contact 45. The springs are the terminals of the legs 37 38 of the signal circuit, and the contact 45 is connected with the other side of the line, preferably through the return circuit from the motor. The flexibility of the springs enables them to give when struck by the tappets, which prevents the contacts from being injured by reason of the little additional movement of the parts before they come to rest after the current is cut off.

As the whole apparatus is primarily designed for an emergency arrangement, it is desirable, particularly in the case of steam valves, that when an accident happens to the machinery and the valve must be closed quickly, the apparatus shall be so arranged that the operator cannot make a mistake and throw the switch the wrong way. To provide for this, a dog 46 is pivoted adjacent to one blade of the switch so that when the switch is opened after the motor has opened the valve, the dog will drop by gravity behind the switch-blade and prevent it from being again closed except to reverse the motor and shut the valve. In case the valve has been only partially opened, and after a while it is desired to open it still farther, the operator can lift the dog by hand out of the way, so that the switch can be closed again. But when the switch is open and the dog has dropped into place, the only thing the operator can do in a hurry is to close the switch on the other contacts and thus reverse the motor to shut the valve; which is the operation always wanted in an emergency.

I do not wish to be limited to a valve as the movable body, since it is clear that other movable bodies might be similarly controlled and I aim to cover by the terms of the appended claims all equivalents and modifications which may fall within the spirit and scope of my invention.

In the appended claims I use the word "freely" with reference to the rotation of the motor to define that rotation of the motor which takes place before it begins to transmit any energy to the valve.

What I claim as new and desire to secure by Letters Patent of the United States, is,

1. In valve-controlling apparatus, the combination with the valve-spindle, of a rotatable nut for operating said spindle and provided with a lug, an arm freely rotatable on the same axis as the nut and adapted to engage with said lug, a loose gear-wheel concentric with the axis of the nut and carrying a lug to engage with said arm, and an electric motor geared to said gear-wheel.

2. In valve-controlling apparatus, the combination with the valve, of an electric motor, a rheostat in circuit with said motor, a switch-arm for operating said rheostat, and a wheel geared with the motor and having a cam-groove to actuate said switch-arm at predetermined times.

3. In valve-controlling apparatus, the combination with the valve, of an electric motor, a rheostat in circuit therewith, a switch-arm for operating the rheostat, a wheel geared with the motor and having a concentric groove with an offset portion at one side of the wheel, said arm engaging with said groove.

4. The combination with a movable body requiring the application of more energy to start than to continue its movement, of an electric motor for moving said body, and automatic means for giving said motor an increased current before it starts said body and for subsequently cutting down said current to slow down the motor.

5. In valve-controlling apparatus, the combination with the valve, of an electric motor, and automatic means for giving said motor an increased current before it starts the valve and for cutting down said current to slow the motor down.

6. In valve-controlling apparatus, the combination with the valve, of an electric motor, a double-pole, double-throw reversing switch in circuit with said motor, and means for automatically preventing said switch from being closed again on the same contacts after the motor has opened the valve and has been open-circuited.

7. In valve-controlling apparatus, the combination with the valve, of an electric motor, a double-pole, double-throw reversing switch in circuit with said motor, and a pivoted dog adapted to lock the switch open after the valve has been opened and the motor open-circuited.

8. In valve-controlling apparatus, the combination with the valve, of a motor, two signaling circuits in parallel, each containing a contact spring, and means for automatically closing one of said circuits when the valve reaches either end of its travel.

9. In valve-controlling apparatus, the combination with the valve, of a motor, two signaling circuits in parallel, each containing a flexible contact spring, a wheel geared to the motor and carrying two tappets, and a contact against which one of said springs is pressed by a tappet when the valve reaches either end of its travel.

10. The combination with a movable body, of an electric motor for moving said body, gearing connecting said motor and body, said gearing having a predetermined amount of lost motion at starting, and means for increasing the motor current during the rotation of said motor in taking up said lost motion.

11. The combination with a movable body, of an electric motor for moving said body, gearing connecting said motor and body, said gearing having a predetermined amount of lost motion at starting, and means for increasing the motor current during the rotation of the motor in taking up said lost motion and for decreasing said current to slow down the motor.

12. The combination with a movable body adapted to be moved back and forth between two extreme positions, of an electric motor for moving said body into either position, gearing connecting said motor and body, said gearing having a predetermined amount of lost motion whereby when the motor is started to move said body from either extreme position it rotates a number of times before beginning to move said body, and means for increasing the motor current during the rotation of said motor in taking up said lost motion and decreasing said current when said body nears its other extreme position.

13. The combination of a valve, a rotatable nut for operating the valve spindle and provided with a lug, an arm freely rotatable on the same axis as the nut and adapted to engage with said lug, a loose gear-wheel concentric with the axis of the nut and carrying a lug to engage with said arm, a shaft mounted in proximity to said gear-wheel and geared therewith, an electric motor geared to said shaft, a rheostat in circuit with said motor, a switch-arm for operating the rheostat, a worm-gear on said shaft, and a wheel geared therewith and having a concentric groove with an offset portion at one side of the wheel, said switch arm engaging with said groove.

In witness whereof I have hereunto set my hand this 20th day of March, 1902.

NORMAN C. BASSETT.

Witnesses:
BENJAMIN B. HULL,
HELEN ORFORD.